Aug. 18, 1931.    B. BRONSON    1,819,147
RUBBER COVERED ARTICLE AND METHOD OF PRODUCING SAME
Filed Jan. 30, 1929
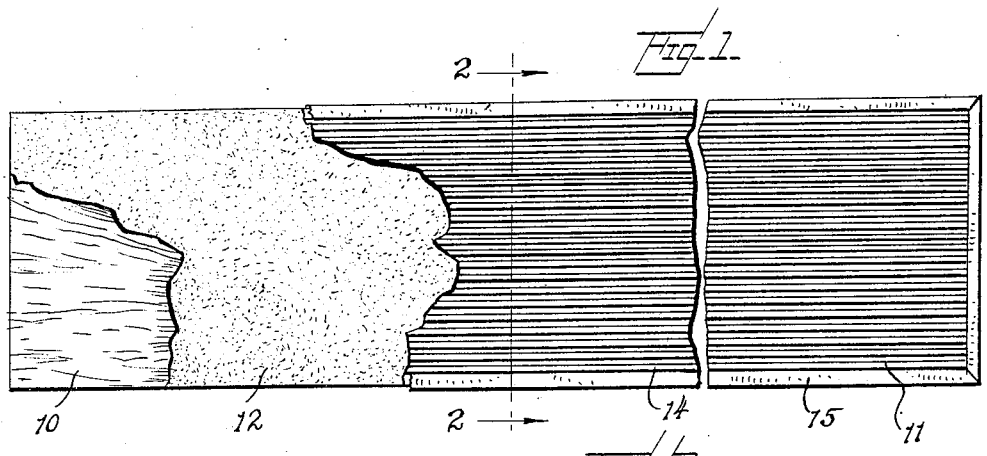
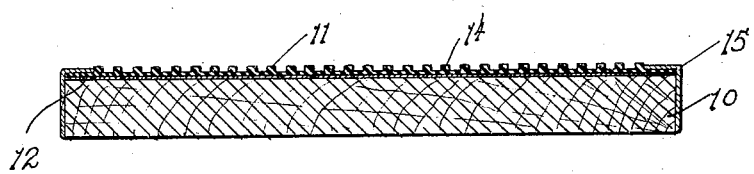
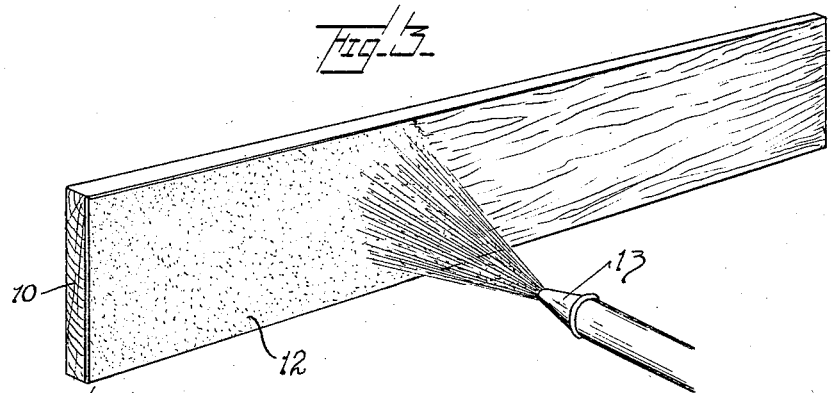

Patented Aug. 18, 1931

1,819,147

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

RUBBER COVERED ARTICLE AND METHOD OF PRODUCING SAME

Application filed January 30, 1929. Serial No. 336,305.

This invention relates to a rubber covered article and the method of producing the same, and more particularly this invention relates to a rubber covered vehicle running board.

The desirability of using rubber as a surface covering for various non-metallic articles has long been recognized, but heretofore it has not been possible to successfully vulcanize rubber to wood and similar materials. To attach a layer of rubber to a wood base it has, heretofore, been necessary to use cement or some form of fastening means for holding the rubber to the wood, and such fastening means have proved to be generally unsatisfactory and unreliable because the rubber tears or pulls away from the base causing bulges or blisters which soon break through and often result in the destruction of the entire covering.

An object of this invention is to provide an article of wood or the like having a rubber covering vulcanized thereto.

Another object of this invention is to provide a novel method by which a rubber covering may be vulcanized to an article made of wood or the like.

The invention may be briefly summarized as consisting in certain novel details of construction, and combinations and arrangements of parts which will be described in the specification and set forth in the appended claims.

In the accompanying drawings:

Figure 1 is a top plan view showing a running board constructed according to my invention.

Fig. 2 is a cross sectional view taken on the line 2—2 of Fig. 1.

Fig. 3 is a perspective view illustrating one step of my method; and

Figs. 4, 5 and 6 are views showing the cross-sectional shape of other forms which the running board of my invention may assume.

Referring now to the drawings in detail, Figs. 1 and 2 show, as an embodiment of my invention, a vehicle running board, but it should be understood that my invention is in no way limited to this particular embodiment since it is applicable to tread members generally and to door panels, bus bodies, desk tops, mop boards and the like.

In constructing my running board I provide a base or board 10, of suitable shape and thickness, to which a layer of rubber 11 is vulcanized. The board is cut to the desired shape and provided with a flat surface which should preferably be left in a slightly roughened condition. For this base or board I prefer to use wood because it is light in weight, strong, and easily obtainable, but it is obvious that such materials as wall board, beaver board, heavy card board, wood pulp, paper pulp, or various compositions could likewise be used. When wood is used as the base I prefer to select woods which contain a minimum amount of natural gums, resins, and oils because the presence of these substances makes it difficult to vulcanize the rubber to the wood. I find that various kinds of oak and chestnut are comparatively free from gums, resins and oils and serve very well for the wood base. However, various kinds of woods can be employed for this purpose although in some instances it may be advisable to extract the gums, resins and oils.

To cause the layer of rubber 11 to adhere strongly to the base 10 I apply a metallic coating 12 to the surface to which the rubber is to be vulcanized. For this coating I prefer to use lead because this material adheres very tenaciously to wood and like materials, possesses a low melting point, and is relatively cheap. However, other metals such as zinc, copper, brass or aluminum may be used. This metallic coating is uniformly applied to the surface of the board preferably by projecting or impacting the metal in molten form against the board, as by the nozzle 13 shown in Fig. 3, and for this purpose I find that projecting apparatus such as is disclosed in United States Patent 1,100,602 issued June 16, 1914, to Erika Morf, serves very well. When the metallic coating is applied in this manner the molten metal is driven against the surface of the board in finely divided form so that the particles of metal are evenly distributed to form a metallic layer. The particles of metal when driven against the board in this manner adhere so firmly to the surface fibers, that, to all purposes and intent, the metallic layer which they form, is in effect, a part of the board itself.

After the base 10 has been thus provided with a metallic coating, a layer of rubber is applied and vulcanized to the layer of metal and to the base. In the vulcanizing process the rubber unites firmly with the metallic layer and it is thereby strongly attached to the base. The exposed surface of the layer of rubber may be provided with a ribbed surface pattern as indicated at 14, or with any other desirable configuration.

I have found that very good results may be obtained when the metallic coating, which is applied to the surface of the base, is approximately one thousandth of an inch in thickness. If desired this metallic coating may also be applied to those surfaces of the board which are not covered with rubber. The application of the metallic coating to these surfaces will prevent the absorption of moisture and the consequent warping or rotting of the board.

To give my running board an attractive and finished appearance, and also to protect the corners of the board from being chipped or splintered, I provide an L-shaped metal guard or binding strip 15, which may be secured around the perimeter of the board by any suitable means. However, such a metal guard or binding strip is not an essential feature of my invention and this member may be omitted.

In Figs. 4, 5 and 6 I have shown different forms of construction which may be employed in carrying out my invention. In the form shown in Fig. 4, the outside edge of the base 10, that is, the edge away from the body of the vehicle, is rounded or tapered, as shown, and the metallic layer 12, and the layer of rubber 11 vulcanized thereto, are extended down over this rounded edge. The edge of this portion of the layer of rubber may be tapered as indicated at 16.

In the form of construction shown in Fig. 5 the metallic layer 12 and the layer of rubber 11 are both applied so as to extend around and cover the outside longitudinal edge of the base 10, and also the marginal portion of the lower surface along this outside edge.

The form of construction shown in Fig. 6 is similar to that shown in Fig. 5, except that in this instance, the layer of metal and the layer of rubber are applied so as to extend around and cover both longitudinal edges of the base 10, and also the marginal portions of the lower surface along these edges.

Thus it will be seen that I have provided a running board having a non-metallic base to which a layer of rubber has been made to adhere without the use of cement or other fastening means such as tacks, clips or fabric. A running board constructed according to my invention will be strong and durable and will have an efficient tread surface. Furthermore, the heat and pressure applied in the vulcanizing operation will straighten warped boards so that articles of great uniformity are produced.

While I have shown and described one embodiment of my invention, it will be understood that I do not limit myself to a running board nor to a wood base or other details of construction, but regard my invention as including such embodiments as come within the spirit of the invention and the scope of the appended claims.

Having thus described my invention, I claim:

1. A rubber covered article comprising a non-metallic base, a coating of metal adhering to said base, and a layer of rubber vulcanized to said coating of metal.

2. The method of making rubber covered articles, which comprises coating a non-metallic base with metal, and then vulcanizing a layer of rubber to said metal.

3. The method of making rubber covered articles which comprises, spraying a layer of metal onto a non-metallic base, and then vulcanizing a layer of rubber to said layer of metal.

4. A rubber covered article comprising a non-metallic base, a thin coating of metal united to said base by adhesion, and a layer of rubber vulcanized to said coating of metal.

5. The method of attaching rubber covering to a wood base which comprises first applying a thin coating of metal to said base, and then vulcanizing a layer of rubber to said coating.

6. A running board comprising a wood base, a thin coating of metal clinging to said base, and a layer of rubber vulcanized to said coating.

In testimony whereof, I hereunto affix my signature.

BUDD BRONSON.